United States Patent [19]
Sutterlin et al.

[11] Patent Number: 5,144,282
[45] Date of Patent: Sep. 1, 1992

[54] ADAPTIVE LAMP MONITOR WITH FIRST AND SECOND COMPARISON RATES

[75] Inventors: Gregory E. Sutterlin, Wexford, Pa.; Samuel Lorincz, Boardman; Charles E. Vink, Niles, both of Ohio

[73] Assignee: General Motors Corporation, Detroit, Mich.

[21] Appl. No.: 643,383

[22] Filed: Jan. 18, 1991

[51] Int. Cl.$^5$ .......................... B60Q 11/00
[52] U.S. Cl. ........................ 340/458; 340/641; 340/642; 307/10.8; 315/129; 364/424.01
[58] Field of Search .............. 340/641, 642, 458, 664; 307/10.8; 315/82, 130, 129; 364/424.01; 324/403, 414

[56] References Cited

U.S. PATENT DOCUMENTS

| | | | |
|---|---|---|---|
| 4,234,878 | 11/1980 | Stark | 340/642 |
| 4,451,882 | 5/1984 | Verse et al. | 340/642 |
| 4,550,303 | 10/1985 | Steele | 340/641 X |
| 4,574,266 | 4/1986 | Valentine | 340/642 X |
| 4,667,187 | 5/1987 | Volk et al. | 340/641 |
| 4,745,339 | 5/1988 | Izawa et al. | 315/130 |
| 4,910,496 | 3/1990 | Hatanaka et al. | 340/458 |

FOREIGN PATENT DOCUMENTS 2715116 10/1978 Fed. Rep. of Germany .

OTHER PUBLICATIONS

*Rev. Esp. Electron.* (Spain), vol. 25, No. 289 (Dec. 1978) "A failure indicator for automobile sidelights", no author indicated. Abstract by G. Wilton.

*Primary Examiner*—Jin F. Ng
*Assistant Examiner*—Jeffrey A. Hofsass
*Attorney, Agent, or Firm*—Robert M. Sigler

[57] ABSTRACT

A lamp monitor provides a sense resistor for each lamp circuit as a special sense terminal member with a series resistance and sense terminals connected to a circuit board in a lamp monitor module. A multiplexing arrangement allows selection of the circuit to be monitored. The monitor samples the voltage across the series resistance by first connecting a capacitor across the sense terminals to be charged to the voltage and then disconnecting the capacitor from the sense terminals and connecting it across the input of an amplifier. The voltage across the lamps is sensed to provide a ratiometric reference for the digitizing of the amplifier output in an analog to digital converter; and a digital computer corrects the input digital signal with a stored non-linear normalization factor relating current to voltage in the lamps. The normalized value is compared with a predetermined percentage of a learned reference to determine lamp outage; and the learned reference is updated at a slowed rate when no lamp outage is detected.

15 Claims, 5 Drawing Sheets

FIG 1
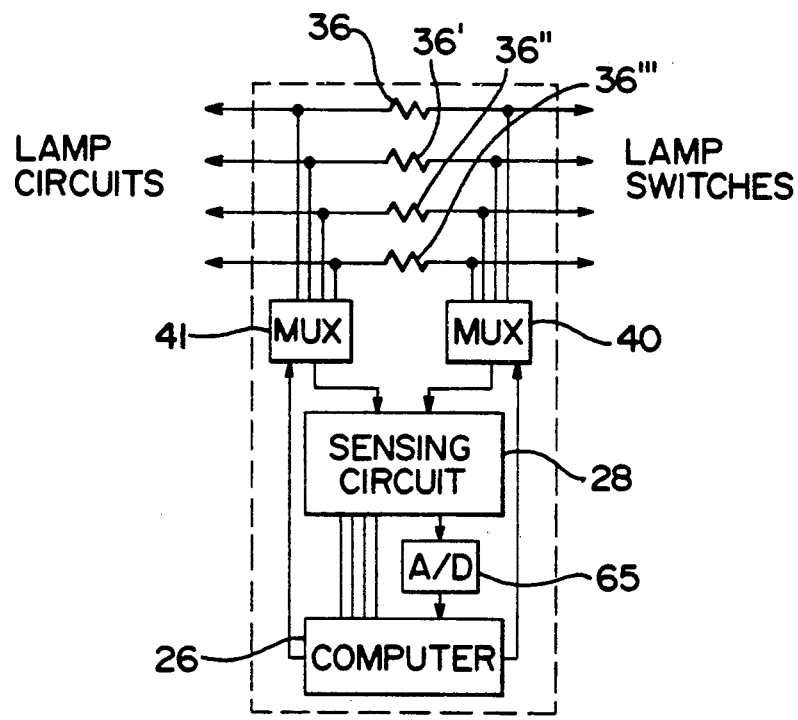
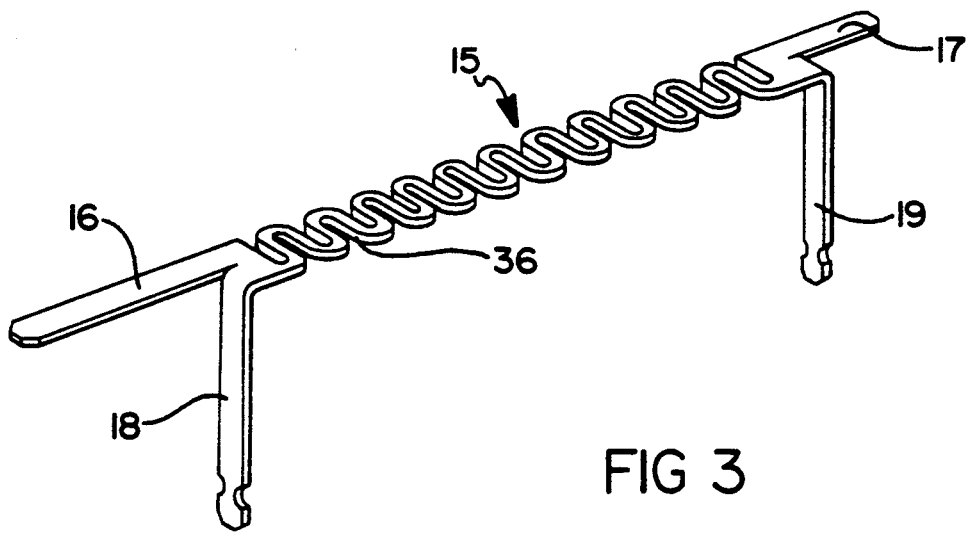
FIG 3

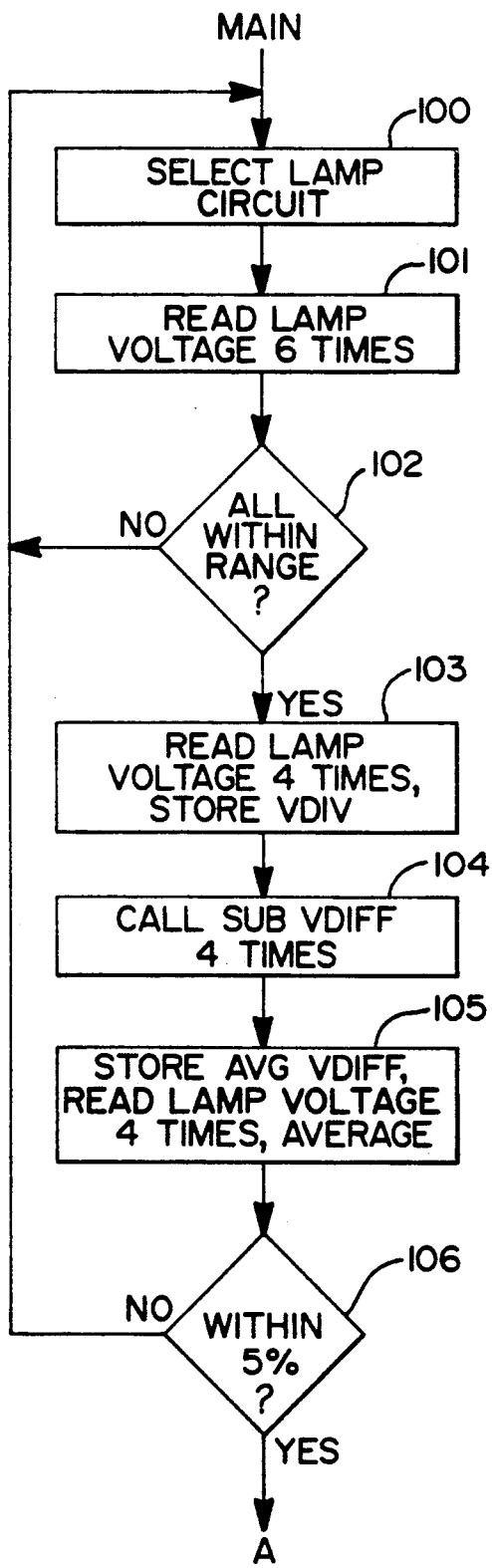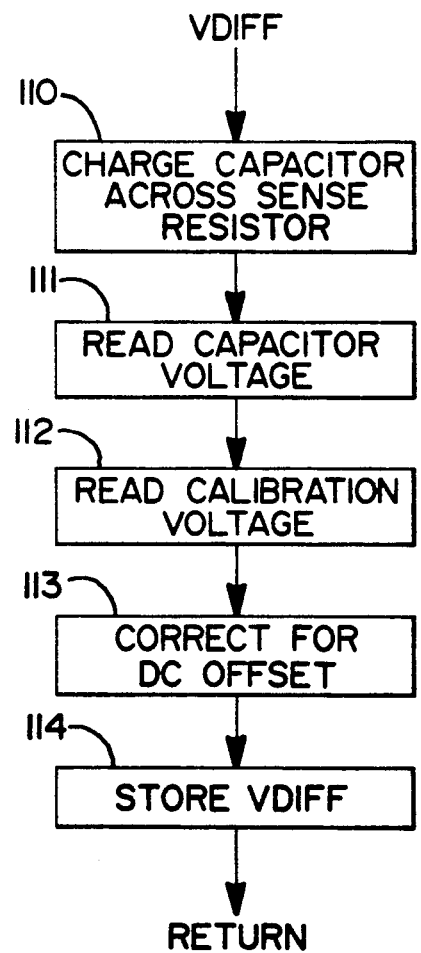

ADAPTIVE LAMP MONITOR WITH FIRST AND SECOND COMPARISON RATES

BACKGROUND OF THE INVENTION

This invention relates to lamp monitor apparatus for determining the outage of a lamp in a lamp circuit. In particular, this invention relates to lamp monitor apparatus suitable for application to a motor vehicle, which typically includes a plurality of lamp circuits having different numbers and types of lamps, a complicated wiring harness, a possibly noisy electrical power supply and other complicating factors.

One known method of monitoring vehicle lamp circuits takes advantage of a high degree of symmetry in many of the circuits, which contain lamps in pairs of the same type operated simultaneously for the same purpose. Many vehicle lamps, such as headlamps, taillamps, stoplamps, turn signal lamps, etc. are duplicated on two sides of the vehicle. The prior art method of lamp monitoring thus provides a series length of wire, known as "ripcord", of matched impedance in the wiring harness current supply to each of a pair of lamps and compares the voltage drops across the wires, with a predetermined difference in voltage indicating a lamp outage. This method is adaptive in a sense, in that it uses each lamp as a reference for the other and will thus adapt to changes which affect each branch of the lamp circuit identically. However, it is somewhat cumbersome, expensive and easily affected by manufacturing variables. In addition, it is limited in application, since not all changes affect each branch of the lamp circuit identically.

SUMMARY OF THE INVENTION

The lamp monitor circuit of this invention is more generally adaptive than that described above, since it compares each lamp circuit with its own prior performance to detect comparatively sudden changes as are produced by a lamp outage but adapts to more gradual changes not associated with lamp outage. The lamp monitor of this invention also provides accuracy of sense voltage measurement in a vehicle environment through a unique physical structure and measuring circuitry and further provides true compensation for the non-linear lamp voltage/current relationship.

A lamp monitor provides a sense resistor for each lamp circuit as a special sense terminal member with a series resistance and sense terminals connected to a circuit board in a lamp monitor module. A multiplexing arrangement allows selection of the circuit to be monitored. The monitor samples the voltage across the series resistance by first connecting a capacitor across the sense terminals to be charged to the voltage and then disconnecting the capacitor from the sense terminals and connecting it across the input of an amplifier. The voltage across the lamps is sensed to provide a ratiometric reference for the digitizing of the amplifier output in an analog to digital converter; and a digital computer corrects the input digital signal with a stored non-linear normalization factor relating current to voltage in the lamps. The normalized value is compared with a predetermined percentage of a learned reference to determine lamp outage; and the learned reference is updated at a slowed rate when no lamp outage is detected.

Further details and advantages of this invention will be apparent from the accompanying drawings and following description of a preferred embodiment.

SUMMARY OF THE DRAWINGS

FIG. 1 shows a lamp system with a lamp monitor according to this invention.

FIG. 3 shows a sense resistor/terminal apparatus for use in the lamp monitor of FIG. 2.

FIGS. 5(A), 5(B) and 6 show flow charts describing the operation of the lamp monitor of FIGS. 1-4.

DESCRIPTION OF THE PREFERRED EMBODIMENT

FIG. 1 shows a lamp system with a plurality of lamp circuits, each connected to a switched lamp power line through a sense resistor (36, 36', 36'', 36'''). The lamp system may be a typical motor vehicle lamp system in which each lamp circuit includes one or more lamps in parallel with each lamp having one terminal grounded and the other connected back through the lamp circuit to the lamp switch and DC electric power. Each lamp circuit is thus connected through a separate control switch to the common electrical power source so that it may be independently activated and deactivated by its own lamp switch. The system of FIG. 1, however, inserts in each lamp circuit one of the sense resistors 36–36''' between the lamp control switch and the lamps of the circuit in parallel. The embodiment of FIG. 1 provides four lamp circuits, each with a sense resistor and from one to four lamps; however, a greater or smaller number of lamp circuits or lamps within each lamp circuit may be provided within the scope of the invention.

Sense resistors 36–36''' are contained within a lamp monitor module 20 which also includes a digital computer 26, a sensing circuit 28, an analog to digital converter (A/D) 65 and two multiplexers (MUX) 40 and 1. MUX 40 has individually selectable inputs each connected to the lamp switch side of one of sense resistors 36–36'''; and MUX 41 has individually selectable inputs each connected to the lamp side of sense resistors 36–36'''. The outputs of MUX 40 and 41 are connected to sensing circuit 28, which has an output connected through A/D 65 to computer 26 and other control and data lines connected directly to computer 26. Computer 26 has control lines connected to MUX 40 and 41 by which individual sense resistors may be selected for connection to sensing circuit 28.

Figure 2:
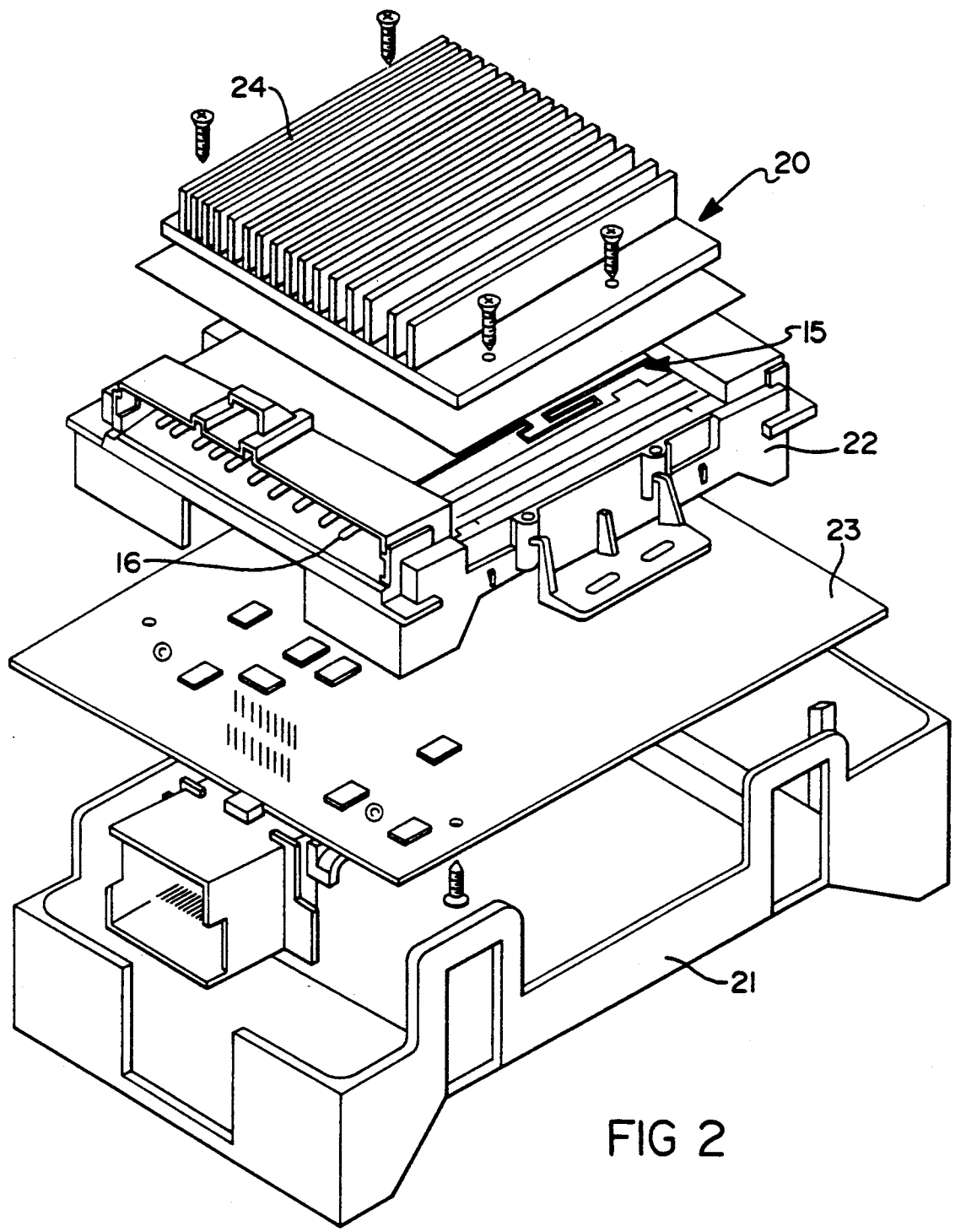
FIG. 2 shows the physical structure of a lamp monitor for use in the lamp system of FIG. 1.

FIG. 2 shows the physical structure of lamp monitor module 20. A case comprises a lower member 21 and an upper member 22 with an attached heat sink 24. The case encloses a circuit board 23 having mounted thereon the components of digital computer 26 and sensing circuit 28 and further encloses sensing resistors 36–36''' in the form of sense terminal members such as member 15 shown in FIG. 3. Sense terminal member 15 may be formed by simple stamping and bending from sheet stock comprising alloy C71500, made of 70 percent copper and 30 percent nickel with a few trace elements to provide high resistivity and low temperature variation or any similar material. Member 15 comprises series terminals 16 and 17 at the two ends thereof with a perpendicular sense terminal 18 extending from the base of series terminal 16 and a sense terminal 19 extending from the base of series terminal 17. The bases of series terminals 16 and 17, where they join sense terminals 18 and 19, respectively, are joined by a series resistance element comprising sense resistor 36, which may be straight or provided with curved portions as shown to increase its effective length as required. Sense resistor 36 is connected in series with the lamps of a lamp circuit by means of series terminals 16 and 18 to provide, by the voltage across sense terminals 18 and 19, an indication of the total lamp current flowing to the lamps of the lamp circuit. Thus, member 15 is supported in upper case member 22 so that sense terminals 18 and 19 are inserted through slots in circuit board 23 and soldered or otherwise electrically connected to circuit traces thereon connected to MUX 40 and 41. Likewise, series terminals 16 and 17 may form part of multiple circuit connectors for the vehicle wiring harness so as to connect the sense resistors into the lamp circuits. The sense resistors 36-36''' are positioned just under heat sink 24 for cooling thereby. The sense resistors for all lamp circuits may thus be contained with the sensing circuitry in a single, convenient module without the necessity of inserting "ripcords" or adding additional wires with special connections at remote vehicle locations.

Sense resistor 36 is provided with a resistance which varies with the type and number of lamps in its lamp circuit to provide, when all lamps are operating normally, a voltage drop of about 100 millivolts. The actual resistance of sense resistor 36 thus may vary in different applications from about 4 milliohms for a high current headlamp circuit to 100 milliohms for a very low current circuit. The sensing resistor/terminal member 15 of FIG. 3 provides a four point voltage measurement: that is, the series terminals 16, 17 are outside the resistive region between the sense terminals 18, 19 and thus do not contribute to the sensed voltage drop. This means that resistance variations or changes associated with terminals and connectors, such as misfitting or corroding terminals, are not measured by the sense terminals. This is an important advantage, since the sensed voltage is very small (100 millivolts) and could be greatly affected by such changes.

Figure 4:
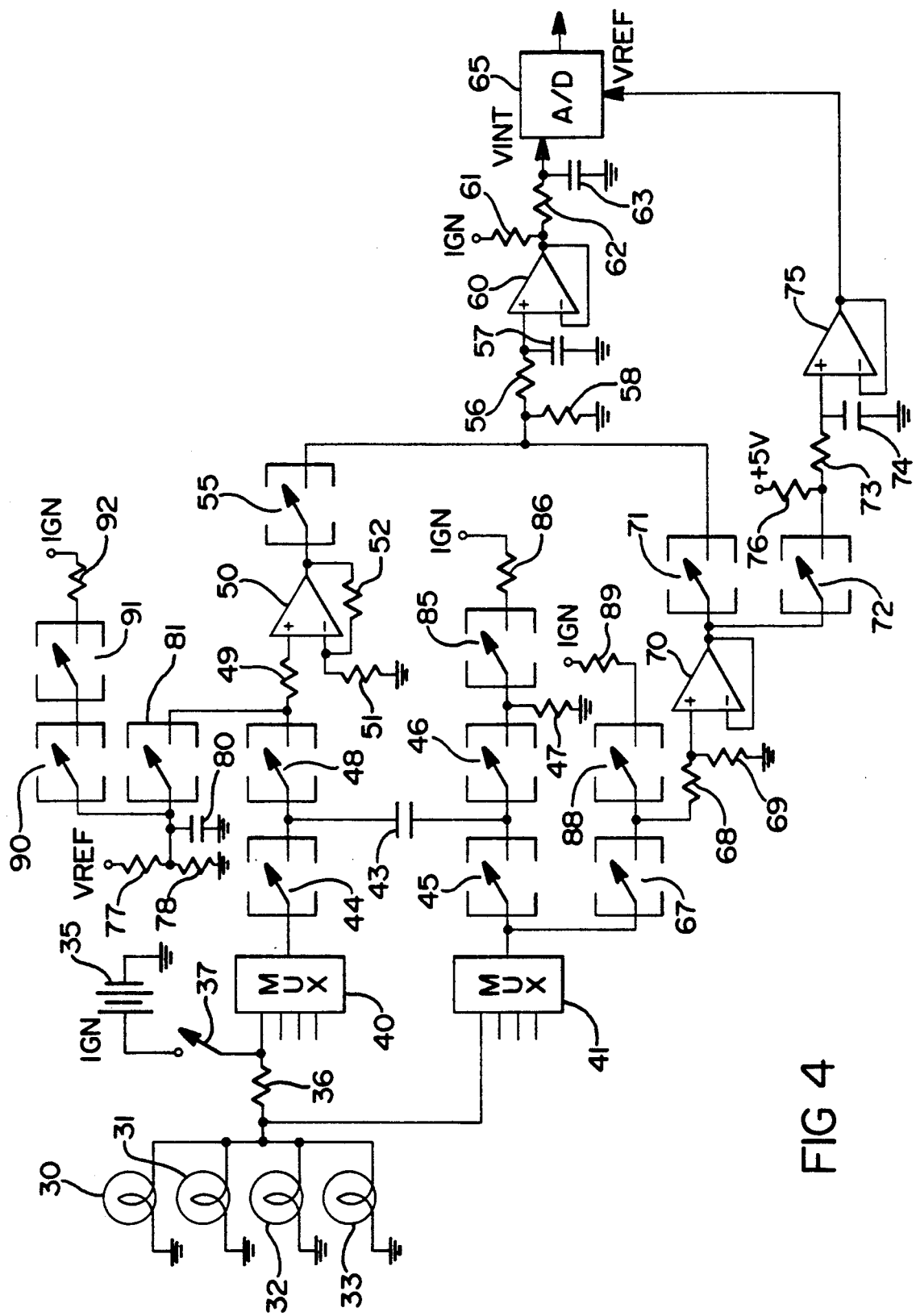
FIG. 4 shows a circuit diagram of the lamp monitor of FIG. 2.

FIG. 4 shows sensing circuit 28, MUX 40 and 41 and the connections to a typical lamp circuit including sense resistor 36. Lamps 30, 31, 32, 33 of a single lamp circuit are connected in parallel to be activated from battery 35 through sense resistor 36 and a lamp switch 37. Battery 35 symbolizes the standard motor vehicle electrical power supply which, in addition to a battery, also includes an alternator, voltage regulator and other parts not shown. It provides DC current on demand at an IGN voltage of 9-16 volts relative to ground. It should be noted that the sensing circuit includes some standard circuit elements, not shown, to protect the circuit elements from voltage spikes, RFI, etc. Lamp switch 37 is any lamp control switch of the vehicle by which a vehicle operator activates or deactivates a lamp circuit having one or more lamps. The embodiment is shown as monitoring a circuit with four parallel lamps; but fewer or more lamps are possible. The upper limit on the number of lamps depends on the tolerance or range of possible lamp currents for lamps on a given circuit. Since a lamp outage is detected by noting the difference in total lamp current for the circuit with one bulb out, as compared with the current with all bulbs operating, this difference must be greater than the total tolerance of the lamp circuit to be identifiable as lamp outage. However, the greater the number of parallel connected lamps in a lamp circuit, the smaller is the difference in current when one goes out. Therefore, a smaller total tolerance is required to reliably identify a lamp outage in a circuit with a greater number of lamps. Four is the greatest number of lamps detectable on a circuit with the standard bulbs used in motor vehicle lamp circuits in this embodiment. However, tighter bulb tolerances could allow a greater number of bulbs in a circuit.

Since it is necessary to monitor each side of sense resistor 36 and there are a plurality of other sense resistors to be similarly monitored, the side of sense resistor 36 connected to lamp switch 37 is connected to one input of a MUX 40; and the side of sense resistor 36 connected to lamps 30-33 is also connected to one input of MUX 41. Each of MUX 40 and 41 have other inputs similarly connected to the other sense resistors and may be operated to connect one of the inputs at a time to an output. The monitor apparatus may thus cycle through the lamp circuits repeatedly with a single sensing circuit. The operation and connections of such multiplexers are well known and need not be further described.

A capacitor 43 is provided for sampling the voltage across a sense resistor by having its leads connected to the outputs of MUX 40 and 41: the upper lead through an analog switch 44 and the lower lead through an analog switch 45. The analog switches are electronically controlled between open and closed states in response to a signal from computer 26. Another analog switch 46 connects the bottom lead of capacitor 43 through a resistor 47 (24K) to ground; and an analog switch 48 connects the upper lead of capacitor 43 through a resistor 49 (200K) to the input of an amplifier 50 with a reference resistor 51 (12.1K) to ground and a negative feedback resistor 52 (154K and 3.32K in series) for a total gain of 14. The output of amplifier 50 is connected through an analog switch 55 and a unity gain buffer amplifier 60 to the VINT input of analog to digital converter (A/D) 65. The input to amplifier 60 is furnished with a filter comprising a series resistor 56 (200K) and a capacitor 57 (220 pF) to ground. In addition, a resistor 58 (820K) is connected from the junction of resistor 56 and analog switch 55 to ground. The output of amplifier 60 is further connected through a resistor 61 (12K) to IGN: and the VINT input of A/D 65 is provided with a filter comprising a series resistor 62 (4.7K) and a capacitor 63 (0.001 uF) to ground.

The output of MUX 41 is further connected through an analog switch 67 and a voltage divider comprising resistors 68 (60.4K) and 69 (27.4K) to the input of a unity gain buffer amplifier 70. The output of amplifier 70 is connected through an analog switch 71 and resistor 56 to the input of amplifier 60 and is further connected through an analog switch 72 to the input of a buffer amplifier 75 having an output connected to the VREF input of A/D 65. The input of amplifier 75 is provided with a filter comprising a series resistor 73 (24K) and a capacitor 74 (220 pF) to ground. The junction of analog switch 72 and resistor 73 is further connected through a resistor 76 (200K) to a terminal +5V at a regulated 5 volts.

A calibration voltage divider comprising a pair of resistors 77 (681K and 6.34K in series) and 78 (12.1K) connected across input terminal VREF of A/D 65 provides a voltage at the junction of those resistors which is a predetermined percentage of VREF. This junction, filtered with a capacitor 80 (220 pF) to ground, is connected through an analog switch 81 to the junction of analog switch 48 and resistor 49. Thus, by closure of analog switches 81 and 55, a calibration voltage is provided to A/D 65.

When analog switches 44 and 45 are closed, with all other analog switches open, to charge capacitor 43 to the voltage across sense resistor 36, the accuracy of the result could be reduced by leakage currents through other analog switches which are open but which, nevertheless, are capable of passing small but significant leakage currents. These leakage currents could be significant, since capacitor 43 only charges to about 100 millivolts but both leads of capacitor 43 are at a voltage close to IGN. Such leakage current paths comprise (1) analog switches 48 and 81 and resistor 78 in parallel with capacitor 81 to ground, (2) analog switch 46 and resistor 47 to ground, and (3) analog switch 67 and resistors 68 and 69 to ground. The inputs of amplifiers 50 and 70 provide too high an impedance to allow any leakage currents to the remainder of the circuit. To reduce these leakage currents to negligible levels, each of the possible leakage current paths is provided with a switched connection through a resistor to IGN which, when applied to the opposite side of the leaking analog switch, reduces the voltage thereacross and thus the leakage current therethrough. For example, analog switch 85 connects the junction of analog switch 46 and resistor 47 through a resistor 86 (2.2K) to IGN so as to raise, when closed, the voltage at its end of analog switch 46 to a level near IGN so as to more closely match the expected voltage on the bottom lead of capacitor 43. Likewise, analog switch 88 connects the junction of analog switch 67 and resistor 68 through a resistor 89 (2.2K) to IGN; and analog switches 90 and 91 in series connect the junction of resistors 77 and 78 through a resistor 92 (2.2K) to IGN.

Figure 5B:
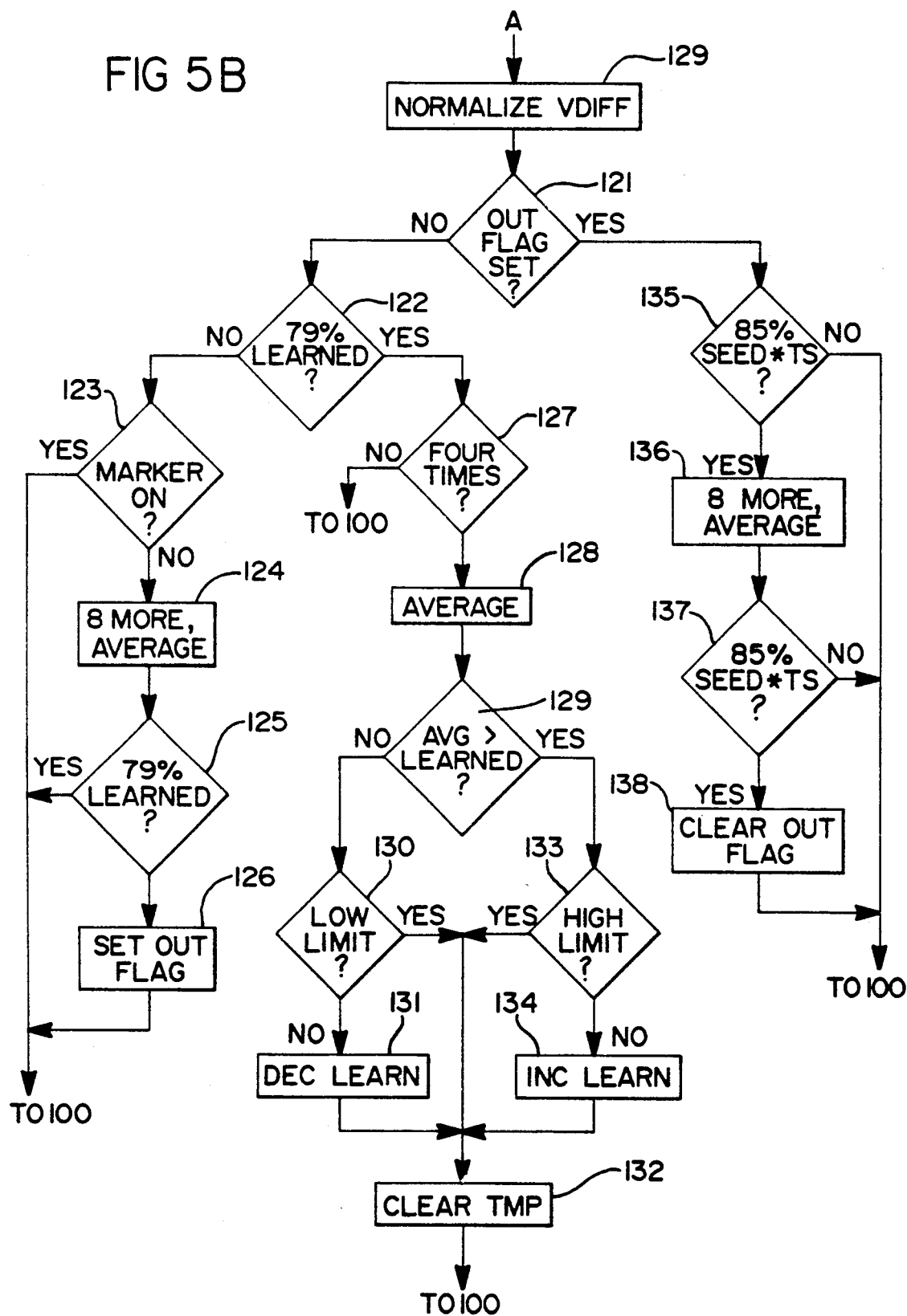

The operation of the system is seen in the flow charts of FIGS. 5(A), 5(B) and 6. FIGS. 5(A) and 5(B) describe the MAIN routine running on computer 26, which begins by selecting (100) a desired lamp circuit to monitor by activating MUX 40 and 41 to connect the sense resistor of that lamp circuit to sensing circuit 28. The reduced lamp voltage is then read six times in step 101. The lamp voltage is defined as the voltage, referenced to ground, on the lamp side of the sense resistor, as seen by MUX 41; and the reduced lamp voltage is the lamp voltage reduced by a constant factor to fit within a range of five volts. Thus, analog switches 67 and 71 are closed to provide a reduced lamp voltage, comprising the lamp voltage divided by resistors 68 and 69, to the VINT input of A/D 65, all other analog switches remaining open. Since analog switch 72 is open, +5 volts is provided to the VREF input of A/D 65 to define the full scale A/D reference: that is, digital 255 from A/D corresponds to 5 volts. The reduction of resistors 68 and 69 serves to reduce the 9–16 volts of IGN applied to the lamps to approximately 2.5 to 4.7 volts, so as to be within the full scale range of 5 volts. The reading is performed 6 times, with the A/D converted, divided lamp voltage read into computer 26 with each reading. Since the A/D reference is a regulated 5 volts, the divided lamp voltage is an absolute quantity. The computer determines whether the lamp circuit is energized by determining (102) if all readings are in a voltage range indicating lamp operation. If any reading is out of range, the lamps are assumed to be off; and the program returns to step 100 to select a new lamp circuit to monitor. If all six readings are in range, the lamps are assumed to be turned on (switch 37 closed) and operating in a stable condition. Four more readings are then taken (103) in the same manner and averaged, with the result stored as the divided lamp voltage VDIV. The new readings are taken in case the lamp voltage was still stabilizing during the first of the previous six readings.

The computer next calls (104) subroutine VDIFF four times. This subroutine reads the voltage across sense resistor 36, termed the differential lamp voltage VDIFF, and corrects the readings for DC offset. Rather than connect the input of amplifier 50 directly across sense resistor 36, capacitor 43 is first charged to the voltage drop of sense resistor 36; and the capacitor is then connected across the input of amplifier 50. Use of the two step sample with capacitor 43 eliminates the large, variable common mode voltage IGN which would be applied to the input of amplifier 50 if connected directly to sense resistor 36. In addition, capacitor 43 filters the sample as it charges to reduce noise from the sample. Subroutine VDIFF, described in greater detail in FIG. 6, first connects (110) capacitor 43 across sense resistor 36 so as to be charged to substantially the same voltage. This is accomplished by closing analog switches 44 and 45 to connect capacitor 43 across resistor 36 and additionally closing analog switches 85, 88, 90 and 91 to reduce leakage current through the other analog switches, all of which are open. After analog switches 41, 45, 85, 88, 90 and 91 have been left closed for 20 milliseconds (about ten time constants of the capacitor charging circuit), the analog switches are opened with the capacitor charged.

The subroutine then reads (111) the capacitor voltage by closing analog switches 46, 48, 55, 67 and 72 with all others open. The voltage across capacitor 43, amplified by a factor of 14 in amplifier 50, is provided to the VINT input of A/D 65. At the same time, the divided lamp voltage is provided through analog switches 67 and 72 to the VREF input of A/D 65 to use as the full scale reference. The use of the divided lamp voltage provides an A/D reference which is ratiometric with the voltage across the lamps, which may vary with the ignition voltage IGN (except for the non-linear voltage/current relationship in lamps, which will be discussed below). The lamp voltage is divided to a range of 2.5 to 4.7 volts to provide good resolution for the amplified VDIFF at about 1.4 volts (14 times 100 millivolts) with a sufficient safety margin to ensure that the amplified VDIFF does not exceed full digital scale.

However, there may be a DC offset error associated with amplifier 50. Therefore, a DC offset error correction is provided. As previously described, VREF is provided across a voltage divider comprising resistors 77 and 78. A known predetermined percentage of VREF may thus be provided to A/D 65 through analog switch 81. The subroutine, after storing the read value of the voltage across capacitor 43, reads (112) a calibration voltage by opening analog switches 46 and 48 and closing analog switch 81 (all other analog switches remaining as before) to provide the known percentage of VREF as the calibration voltage to the VINT input of A/D 65. If the actual output of A/D 65 differs from an expected value based on the known percentage of VREF, the computer corrects (113) for DC offset by adding this difference to the stored value of the capacitor voltage to create the differential lamp voltage VDIFF, which is stored (114).

Returning to step 105 of the MAIN routine after four iterations of subroutine VDIFF, an average of the four compensated values of VDIFF is stored; and the lamp voltage is read four more times to ensure that a lamp has not been turned off during the running of subroutine VDIFF. The average from step 105 is thus compared (106) with the previous average from step 103. If the averages from these two steps do not agree within 5 percent, the program returns to step 100 to select the next lamp circuit. If the averages are within 5 percent, however, the MAIN routine continues, as shown in FIG. 5(B).

Next, the stored value of VDIFF is normalized for the actual current in the lamp circuit. Lamps are supplied with a rated current at a given rated voltage. However, the relationship between current and voltage is not linear. A typical relationship may be expressed in the following equation:

$$I_{lamp} = I_{rated}(V_{app}/V_{rated})^{0.55},$$

wherein the actual lamp current $I_{lamp}$ at an applied lamp voltage $V_{app}$ is related to the rated lamp current and voltage. Therefore, although VDIFF is supposedly ratiometric with the voltage across the lamps, the relationship is not truly ratiometric, due to this non-linearity. Normalization compensates for the non-linear current/voltage relationship in the lamps to provide a correction to the ratiometric relationship. Thus, computer 26 includes in memory a lookup table of normalization factors, based on the preceding equation, as a function of the divided lamp voltage, which corresponds to the applied voltage $V_{app}$ in the equation. The program thus normalizes (120) the stored value of VDIFF (which is supposed to vary with lamp current) by multiplying it by the normalization factor from the lookup table corresponding to the stored average divided lamp voltage VDIV.

The normalized value of VDIFF from step 120 is ready for comparison with a reference to determine whether or not a lamp is out in this lamp circuit. However, the reference for each lamp circuit is not fixed but is a learned value allowed to adapt, within certain limits, to actual lamp and circuit conditions. The remainder of the MAIN routine is concerned with the comparison to determine if a lamp is out and control of the reference learning process.

After step 120, the routine determines (121) if an OUT flag is already set. An out flag for each lamp circuit comprises a bit in the alterable memory of computer 26 which, when set, indicates a lamp out in the lamp circuit and, when not set, indicates no lamp out in the lamp circuit. If the OUT flag for the lamp circuit is not already set, the routine determines (122) if the normalized VDIFF is equal to at least 79 percent of a stored learned reference for the lamp circuit. If not, then VDIFF, which represents the total lamp current of the lamp circuit, is at least 21 percent low; and a lamp is probably out. The 79 percent figure is based on a lamp tolerance of 5 percent. If one lamp of four were to go out, the total current would nominally drop to 75 percent of its former value; however, since the lost lamp current might have been smaller than nominal by 5 percent, the test is based on the higher figure of 79 percent.

However, additional tests are performed before the lamp outage is accepted. For example, some vehicles include high resistance side marker lamps which are connected between the ungrounded sides of turn signal and park lamps. In this way the side marker lamps may be energized by either of the turn signal and park lamp circuits separately by using the lower resistance lamp of the other, unactivated circuit as a ground path. The other lamp, having a comparatively low resistance, drops a comparatively low voltage and is not lit. It is such a system that, when both the park lamp and turn signal circuits are energized, exhibits the phenomenon of side marker lamps which flash in opposite synchronization with turn signal lamps. Due to the peculiarities of these side marker lamp connections, the park lamp circuit could be fooled into thinking a lamp is out when the side marker lamp is not conducting due to a zero voltage drop across it when the turn signal is flashing on. Therefore, to prevent such an erroneous conclusion, the routine determines (123) if this is a lamp circuit including a side marker lamp and the corresponding turn signal lamp is on. If so, the routine returns to step 100 to select another lamp circuit.

The routine then obtains (124) eight more normalized VDIFF samples and averages them. This new average is now compared with 79 percent of the learned reference; and, if it is less, the OUT flag is set (126) and the routine returned to step 100.

If the OUT flag is determined to be set at step 121, the routine next determines (135) whether the normalized VDIFF is at least equal to 85 percent of a constant reference equal to 105 percent of the normal expected total lamp current for the circuit (five percent higher due to lamp tolerance). This constant is stored as a constant SEED times another factor TS which is adjustable to adapt module 20 to different vehicles and lamp circuits. The module of this embodiment, for example, would have a single constant SEED and a value of TS for each of the four lamp circuits, which would vary with the number and type of lamps in the circuits. If the normalized VDIFF is lower, the routine returns to step 100. If the normalized VDIFF is equal or higher, eight more normalized VDIFF values are obtained (136) and averaged and the test is again performed (137) with the new average and the same result if the normalized VDIFF is lower than 85 percent of SEED*TS. If the normalized VDIFF is equal or higher, however, such as after a bad lamp has been replaced, the OUT flag is cleared (138) before the routine returns to step 100.

The learned reference for a lamp circuit is updated only when the lamps are all operating. This is determined at step 122 if the normalized VDIFF is at least 79 percent of the learned reference. If so, the routine determines (127) if this is the fourth such determination since the last reference update. This slows the reference updating for stability. If this is not the fourth, the routine returns to step 100. If it is, however, the last four normalized VDIFF values are averaged (128); and the average is compared with the learned reference (129). If they are equal, no change will take place; and temporary memory is cleared (132) before the routine returns to step 100. If the new average is less than the learned reference, the routine ensures that the learned reference does not fall below a lower limit by determining (130) if the learned reference is less than a constant comprising 85 percent of SEED*TS. If it is at this lower limit, then the learned reference is not updated; and the routine proceeds to step 132. If it is not at the lower limit, however, the learned reference is decremented (131) before proceeding to step 132. A similar limit of 100 percent SEED*TS exists on the high side. The routine determines (133) whether the learned reference is already at the upper limit and increments (134) the learned reference only if not yet at the upper limit.

The embodiments of the invention in which an exclusive property or privilege is claimed are defined as follows:

1. Lamp monitor apparatus for a vehicle lamp circuit having one or more lamps connected in parallel through a lamp switch to an electric power source, the lamp monitor apparatus comprising, in combination:

first means for sensing the value of an electrical parameter varying with total lamp current in the lamp circuit when the lamp switch is closed to energize the lamps;

second means for repeatedly comparing, at a first rate, the sensed value with a first predetermined percentage of a learned reference and signaling a lamp outage if the sensed value does not exceed the first predetermined percentage; and third means for repeatedly comparing, at a second rate slower than the first rate, the sensed value with the learned reference and adjusting the learned reference by an increment toward the sensed value when no lamp outage is signaled.

2. The lamp monitor apparatus of claim 1 in which the first predetermined percentage is based substantially on the ratio of total lamp current with one lamp not conducting to the total lamp current with all lamps of the circuit conducting, the ratio increased by a lamp tolerance factor.

3. The lamp monitor apparatus of claim 1 in which, once a lamp outage is signaled, the second means compares the sensed value with a second predetermined percentage of a fixed reference based on the total lamp current with all lamps conducting plus the lamp tolerance factor.

4. The lamp monitor apparatus of claim 1 in which the first means senses the electrical parameter a plurality of times and the sensed value is an average thereof.

5. The lamp monitor apparatus of claim 1 in which the first means comprises an electrical resistor connected in series with the lamps so as to carry the total lamp current.

6. The lamp monitor apparatus of claim 5 in which the electrical parameter is derived from the voltage drop across the electrical resistor.

7. The lamp monitor apparatus of claim 1 in which the vehicle lamp circuit is associated in a vehicle with one or more additional vehicle lamp circuits, the first means comprises separate elements associated with the lamp circuit and each of the additional lamp circuits, and the second and third means comprise a single apparatus selectively connected by multiplex apparatus to each of the separate elements of the first means.

8. The lamp monitor apparatus of claim 1 in which the third means limits adjustment of the learned reference between low and high limits.

9. The lamp monitor apparatus of claim 1 further comprising:

fourth means for sensing the voltage across the one or more lamps in parallel; and fifth means for determining whether the lamp switch is closed to energize the lamps by comparing the sensed voltage of the one or more lamps in parallel with a lamp voltage reference indicative of an operating voltage across the lamps.

10. The lamp monitor apparatus of claim 9 in which:

the fifth means compares the sensed voltage across the one or more lamps in parallel with the lamp voltage reference a plurality of times; and a predetermined number of the plurality of comparisons indicative of an operating voltage across the lamps is required to indicate that the lamp switch is closed.

11. The lamp monitor apparatus of claim 10 in which the predetermined number of the plurality of comparisons is the entire plurality of comparisons.

12. The lamp monitor apparatus of claim 10 in which the fifth means performs a first number of the plurality of comparisons before the second means compares the sensed value of the electrical parameter with the first predetermined percentage of the first reference and a second number of the plurality of comparisons after the second means compares the sensed value of the electrical parameter with the first predetermined percentage of the first reference but before the second means signals a lamp outage.

13. The lamp monitor apparatus of claim 1 in which the second means and third means are parts of a single digital system in which the second means performs its comparisons at regular first predetermined times and the third means performs its comparisons at second predetermined times associated with non-consecutive occurrences of the first predetermined times.

14. The lamp monitor apparatus of claim 13 in which:

the single digital system is a digital computer, the second means and third means comprise elements thereof controlled by first and second portions, respectively, of a control program, and the second portion of the control program is executed no more often than once every N executions of the first portion of the control program, where N is an integer.

15. The lamp monitor apparatus of claim 14 in which N equals 4.

* * * * *